United States Patent
Hwang et al.

(10) Patent No.: US 12,467,465 B2
(45) Date of Patent: Nov. 11, 2025

(54) FAN MOTOR

(71) Applicant: LG Electronics Inc., Seoul (KR)

(72) Inventors: Eunji Hwang, Seoul (KR); Byungjik Kim, Seoul (KR); Sunggi Kim, Seoul (KR); Jisu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 18/488,445

(22) Filed: Oct. 17, 2023

(65) Prior Publication Data

US 2024/0178717 A1 May 30, 2024

(30) Foreign Application Priority Data

Nov. 30, 2022 (KR) .......................... 10-2022-0164688

(51) Int. Cl.
| | |
|---|---|
| F04D 25/06 | (2006.01) |
| F04D 25/08 | (2006.01) |
| F04D 29/059 | (2006.01) |
| F16C 35/077 | (2006.01) |
| H02K 5/16 | (2006.01) |

(52) U.S. Cl.
CPC .......... F04D 25/062 (2013.01); F04D 25/082 (2013.01); F04D 29/059 (2013.01);
(Continued)

(58) Field of Classification Search
CPC .. F16C 35/077; F16C 25/083; F16C 2226/76; F16C 2226/70; F16C 2226/72;
(Continued)

(56) References Cited

U.S. PATENT DOCUMENTS

| 7,594,760 B2 * | 9/2009 | Goss ..................... F16C 35/061 |
| | | 384/535 |
| 2012/0199129 A1 * | 8/2012 | Kenyon ............ A61M 16/0605 |
| | | 128/205.25 |

(Continued)

FOREIGN PATENT DOCUMENTS

| CN | 107532652 | 1/2018 |
| CN | 112470371 | 3/2021 |

(Continued)

OTHER PUBLICATIONS

Office Action in Korean Appln. No. 10-2022-0164688, mailed on Jul. 26, 2024, 11 pages (with English translation).

(Continued)

*Primary Examiner* — Thomas Fink
(74) *Attorney, Agent, or Firm* — Fish & Richardson P.C.

(57) ABSTRACT

A fan motor is disclosed. The fan motor includes a rotating shaft, a motor, a bearing, a bearing housing, a preload applying device, and a bush. The preload applying device is disposed between one axial end of the bearing and the bearing housing, and applies force to the one axial end of the bearing in an axial direction by using elastic force. The bush is coupled to an outer circumferential surface of the bearing and slidably mounted on an inner circumferential surface of the bearing housing in an axial direction. A protrusion is formed on one axial end portion of the bush, and a protrusion accommodating groove is formed on an axial inner surface of the bearing housing. Accordingly, the preload applying device can continuously apply an appropriate preload to the bearing, while the bush can suppress slipping of an outer ring of the bearing.

17 Claims, 11 Drawing Sheets

(52) U.S. Cl.
CPC ........ *F16C 35/077* (2013.01); *F16C 2360/46* (2013.01); *H02K 5/16* (2013.01)

(58) Field of Classification Search
CPC .............. F16C 2226/78; F16C 2226/80; F16C 35/042; F16C 2360/46; F04D 13/026; F04D 13/0633; F04D 25/062; F04D 29/056; F04D 29/0563; F04D 29/059; F04D 25/082; F04D 25/083; H02K 15/144; H02K 5/16
USPC ...................................... 384/517; 417/423.12
See application file for complete search history.

(56) References Cited

U.S. PATENT DOCUMENTS

| | | | |
|---|---|---|---|
| 2014/0270615 A1 | 9/2014 | Fisher et al. | |
| 2018/0252266 A1* | 9/2018 | Oketani | ................. F16C 19/50 |
| 2020/0392989 A1* | 12/2020 | Kim | ....................... H02K 5/161 |
| 2022/0094237 A1 | 3/2022 | Kisch et al. | |

FOREIGN PATENT DOCUMENTS

| | | | | |
|---|---|---|---|---|
| JP | 2006-217751 | | 8/2006 | |
| JP | 2020018032 A | * | 1/2020 | ............. F16C 19/06 |
| KR | 20-1997-0011393 U | | 3/1997 | |

OTHER PUBLICATIONS

Extended European Search Report in European Appln. No. 23202796.1, mailed on Mar. 15, 2024, 8 pages.

* cited by examiner

← - - - - : AIR FLOW DIRECTION

FAN MOTOR

CROSS-REFERENCE TO RELATED APPLICATION

Pursuant to 35 U.S.C. § 119(a), this application claims the benefit of the earlier filing date and the right of priority to Korean Patent Application No. 10-2022-0164688, filed on Nov. 30, 2022, the contents of which are incorporated by reference herein in their entirety.

TECHNICAL FIELD

The present disclosure relates to a fan motor, and more particularly, to a fan motor capable of continuously applying a preload to a bearing while suppressing slipping of the bearing.

BACKGROUND

Electric motors may be installed in home appliances such as cleaners, hair dryers, and the like.

A vacuum cleaner or a header dryer may generate rotational force by using an electric motor as a power source.

For example, an electric motor may be fastened to a fan. The fan may rotate at high speed by receiving power from the electric motor to generate an air flow.

A user operates a handy-stick cleaner or a hair dryer while holding it with a hand.

In order to enhance user's portability and convenience, reduction of size and weight of a cleaner or a hair drier is required.

In order to reduce a weight of a fan motor of a cleaner, a plastic material may be used instead of a metal material as a housing material.

In a fan motor rotating at a high speed of 100,000 rpm or more, bearings rotatably support both sides of a rotating shaft. Each of the bearings may include an inner ring, an outer ring, and a ball. The inner ring is coupled to the rotating shaft and rotates together with the rotating shaft. The outer ring may be surrounded by a bearing housing and fixed to the bearing housing. The ball is disposed between the inner and outer rings, and rolls while being in contact with the inner and outer rings.

However, when the fan motor rotates at the high speed, the outer ring of the bearing slips on an inner circumferential surface of the bearing housing due to rotational force transmitted from the inner ring through the ball.

To solve this problem, the outer ring of the bearing may be adhered to the inner circumferential surface of the bearing housing by use of an adhesive.

On the other hand, when the fan motor rotates at the high speed, the ball causes a minute movement in gaps (micro gaps) between the ball and the outer ring of the bearing and between the ball and the inner ring, and thereby rubs against the outer and inner rings to be worn.

In order to minimize the minute movement of the ball in the gaps, a preload may be applied to the outer ring of the bearing in an axial direction.

When a preload is applied to the outer ring of the bearing in the axial direction and the outer ring of the bearing is adhered to the bearing housing, an axial position between two bearings supporting the rotating shaft is fixed.

However, when the preload is applied to the bearing and the outer ring of the bearing is adhered to the bearing housing, the following situation occurs during an actual operation of a fan motor, causing a problem in that a magnitude of the preload is changed.

First, a preset preload may not be applied due to a change in volume (shrinkage or expansion) that occurs as an adhesive is cured. Even during operation of the fan motor, the preload may change due to thermal characteristics of the adhesive.

Second, since the bearing housing is made of the plastic material which is different from the metal material of which the rotating shaft is made, an amount of preload may change due to a temperature change caused by a difference in thermal characteristics between the two materials.

Third, the bearing housing using the metal material does not cause the preload change due to a difference in thermal expansion coefficient, but temperatures of components may vary even if the same material is used. This temperature difference may cause the change in the amount of preload. If the outer ring or ball of the bearing is worn, the preload applied to the bearing may be drastically decreased.

As a result, if an initially set preload amount of the bearing is changed, a critical speed of a rotating body may be reduced, and vibration may shorten a lifespan of the rotating shaft or the bearing or damage the rotating shaft or the bearing.

Therefore, in order to suppress the outer ring of the bearing from slipping in the fan motor of the cleaner, the outer ring of the bearing has been assembled by being adhered to the housing, but in this case, there is a problem in that various failure situations occur due to the change in the magnitude of the preload of the bearing.

Prior Art Patent Document US 2022/0094237 A1 (Mar. 24, 2022; hereinafter, referred to as Patent Document 1) discloses an electric motor having a heat dissipation structure of a bearing.

A can surrounds a bearing housing and serves as a heat dissipation fin.

Heat of a ball bearing generated during an operation of the motor is dissipated to outside of the motor through a ball bearing housing, the can, a motor casing, and a casing cover.

However, Patent Document 1 discloses a structure in which the can simply surrounds the bearing housing, but fails to disclose a phenomenon that the outer ring of the bearing slips.

SUMMARY

The present disclosure describes a fan motor having a structure capable of solving those problems and other drawbacks.

A first aspect is to provide a fan motor with a bush having a structure that is capable of suppressing an outer ring of a bearing from slipping while continuously applying an appropriate preload to the bearing.

A second aspect is to provide a fan motor with a bush having a structure that can be applied regardless of a material of a bearing housing.

A third aspect is to provide a fan motor with a bush having a structure that is capable of being easily manufactured and significantly contributing to reduction of size and weight of the fan motor.

A fourth aspect is to provide a fan motor with a bush having a structure that is capable of lowering temperature of a bearing.

As a result of an intensive research, the inventors of the present disclosure can achieve solution to the problems and the aforementioned first to fourth aspects of the present disclosure by the following embodiments of the present disclosure.

(1) In order to achieve the first aspect, a fan motor according to one embodiment of the present disclosure includes: a rotating shaft on which an impeller is mounted; a motor unit that includes a rotor connected to the rotating shaft and a stator enclosing the rotor, and drives the rotating shaft; a bearing that supports the rotating shaft; a bearing housing that accommodates the bearing therein; a preload applying device that is disposed between one axial end of the bearing and the bearing housing to apply force to the one axial end of the bearing using elastic force; and a bush that is coupled to an outer circumferential surface of the bearing and mounted on an inner circumferential surface of the bearing housing to be slidable in an axial direction. A protrusion is formed on one of one axial end of the bush and an axial inner surface of the bearing housing, and a protrusion accommodating groove is formed on another one of the one axial end of the bush and the axial inner surface of the bearing housing. With the configuration, the bush can suppress the bearing from slipping on an inner circumferential surface of the bearing housing, while the preload applying device can apply an appropriate preload to the bearing.

(2) In the item (1), the protrusion may protrude from the one axial end of the bush toward the axial inner surface of the bearing housing, and the protrusion accommodating groove may be recessed into the axial inner surface of the bearing housing, and coupled to the protrusion. This can facilitate formation of the protrusion and the protrusion accommodating groove.

(3) In order to achieve the second aspect, in the item (1), the bush may be formed in a cylindrical shape. This can simplify a structure of the bush, and allow an axial movement of the bush on the inner circumferential surface of the bearing housing while surrounding the bearing. In addition, the bush can be applied regardless of a material of the bearing housing.

(4) In order to achieve the third aspect, in the item (3), the bush may be formed by rolling a rectangular plate having a constant thickness into a circular shape, and an opening may be formed between both ends of the bush in a circumferential direction. Through this, the bush can be easily manufactured and a manufacturing cost of the bush can be reduced even if the thickness of the bush is thin. This can greatly contribute to reducing size and weight of the fan motor.

(5) In the item (1), the protrusion may be provided by at least one in number, and the protrusion accommodating groove may be provided in plurality to be continuously disposed along a circumferential direction. This can facilitate engagement between the protrusion and the protrusion accommodating grooves.

(6) In the item (1), the protrusion may be formed in any one of a triangular shape, a semicircular shape, and a trapezoidal shape. Accordingly, the protrusion can be implemented in various shapes.

(7) In the item (1), the protrusion accommodating groove may have a plurality of inclined surfaces inclined at a preset angle with respect to the axial direction, and the protrusion may be coupled by being inserted between the plurality of inclined surfaces. Through this, when assembling the bush and the bearing housing, the protrusion can be easily assembled as if sliding along the inclined surfaces of the protrusion accommodating grooves without accurately aligning the protrusion and the protrusion accommodating grooves.

(8) In order to achieve the fourth aspect, in the item (1), the bush may be formed of a metal material. Accordingly, the bush can additionally serve as a heat dissipation fin for lowering temperature of the bearing during operation of the fan motor.

(9) In the item (1), the preload applying device may be a spring or a wave washer. Through this, the wave washer facilitates setting of a preload to be applied to the bearing.

(10) In the item (1), the bearing may include: an inner ring that is coupled to the rotating shaft; an outer ring that surrounds the inner ring; and a plurality of balls that roll in contact between the inner ring and the outer ring, wherein the preload applying device may be in contact with the outer ring to apply the force toward the impeller in the axial direction. This can facilitate the preload applying device to apply the force in the axial direction to the outer ring of the bearing.

(11) In the item (10), each of the bearing and the bearing housing may be provided in plurality, and the plurality of bearings may be disposed on both sides of the rotating shaft with the motor unit interposed therebetween. Accordingly, the plurality of bearings can stably support the rotating shaft.

(12) In the item (11), a first bearing of the plurality of bearings may be disposed adjacent to the impeller, and a second bearing of the plurality of bearings may be disposed in an opposite direction to the first bearing with respect to the motor unit, a first outer ring of the first bearing may be adhered by an adhesive onto an inner circumferential surface of a first bearing housing accommodating the first bearing therein, a second outer ring of the second bearing may be adhered onto an inner circumferential surface of the bush by an adhesive, and the bush may be mounted on an inner circumferential surface of a second bearing housing accommodating the second bearing therein to be slidable in the axial direction. With the configuration, the bush can axially move along with the bearing on the inner circumferential surface of the bearing housing.

(13) In the item (12), the fan motor may further include a stopper that extends radially inward from one end of the first bearing housing so as to cover the first bearing. The stopper can thus suppress the first bearing from being axially separated from the first bearing housing.

(14) In the item (12), the fan motor may further include: a shroud that accommodates the impeller therein; a plurality of vanes that are coupled to an inside of the shroud to guide a flow of air suctioned by the impeller; and a vane hub that has the plurality of vanes on an outer circumferential surface thereof. The first bearing may be disposed at a downstream side of the impeller based on a flow direction of the air, and the first bearing housing may be accommodated inside the vane hub. This can allow the vanes to switch a rotational motion into a linear motion while minimizing air flow resistance.

(15) In the item (12), the fan motor may further include: a shroud that accommodates the impeller; a first housing that accommodates the first bearing housing therein and is coupled to an inside of the shroud; and a second housing that accommodates the motor unit therein, is disposed at a downstream side of the first housing based on a flow direction of air suctioned by the impeller, and is coupled to the inside of the shroud. With the configuration, the first housing can stably support the first bearing housing and the second housing can stably support the second bearing housing.

(16) In order to achieve the above aspects, a fan motor according to the present disclosure may include an impeller that suctions air; a rotating shaft on which the impeller is mounted; a motor unit that includes a rotor connected to the rotating shaft and a stator enclosing the rotor, and drives the rotating shaft; a plurality of bearings that support both ends of the rotating shaft with the motor unit interposed therebetween; a plurality of bearing housings that respectively accommodate the plurality of bearings; a preload applying device that is accommodated in the bearing housing and applies force to one axial end of the bearing in an axial direction using elastic force; and a bush that is formed in a cylindrical shape and disposed between the bearing and the bearing housing, wherein the bush may have: an inner circumferential surface that surrounds the bearing and is coupled with an outer circumferential surface of the bearing; an outer circumferential surface that is disposed in an opposite direction to the inner circumferential surface and is in contact with the inner circumferential surface of the bearing housing to be slidable in the axial direction of the rotating shaft; and a protrusion that is disposed between the inner circumferential surface and the outer circumferential surface and protrudes toward the bearing housing in the axial direction.

(17) In the item (16), a protrusion accommodating groove may be formed on an inner surface of the bearing housing to be engaged with the protrusion.

(18) In the item (16), the impeller may be coupled to one end portion of the rotating shaft, the plurality of bearings may include: a first bearing that is disposed at an upstream side of the motor unit based on a flow direction of the air; and a second bearing that is disposed at a downstream side of the motor unit, the plurality of bearing housings may include: a first bearing housing that accommodates the first bearing therein; and a second bearing housing that accommodates the second bearing therein, the bush may be disposed between the second bearing and the second bearing housing, and the preload applying device accommodated in the second bearing housing may transfer the force applied to the second bearing in the axial direction to the first bearing through the rotating shaft.

(19) In the item (16), the bush may be made of a metal that is different from a material of which the bearing housing is made.

(20) In the item (16), an opening may be formed through one side of the bush in a circumferential direction.

According to embodiments of the present disclosure, the following effects can be provided.

First, a bush is disposed between an outer ring of a bearing and a bearing housing to surround the outer ring. The bush is formed in a cylindrical shape. A plurality of protrusions protrude from one axial end of the bush in an axial direction. A plurality of protrusion accommodating grooves are concavely formed on an axial inner surface of the bearing housing. The protrusions are engaged with the protrusion accommodating grooves. The outer ring may be adhered onto the bush.

With the configuration, since the protrusions of the bush and the protrusion accommodating grooves of the bearing housing are coupled to each other, the bush can suppress the bearing from slipping in a circumferential direction of the bearing housing. The bush is slidably mounted on an inner circumferential surface of the bearing housing so that the bearing can move in the axial direction on the inner circumferential surface of the bearing housing. This can constantly maintain a magnitude of preload to be applied to the bearing (constant pressure preloading method).

Even if a change in volume of an adhesive occurs due to curing of the adhesive, a preset preload can be constantly applied to the bearing by a preload applying device.

Second, the preload applying device may be configured as a wave washer or a spring. The preload applying device is disposed between one axial end of the bearing and an axial inner surface of the bearing housing. The preload applying device can apply an axial preload to the bearing while a radial motion is restricted by the bearing housing.

Third, a protrusion may be formed in any one shape selected from a triangular shape, a semicircular shape, and a trapezoidal shape, such as sawtooth. A protrusion accommodating groove may be formed in a shape corresponding to the protrusion. Even if the protrusion of the bush and the protrusion accommodating groove are not precisely aligned with each other, the bush can be easily assembled as if obliquely sliding on the bearing housing.

Fourth, the bush may be manufactured by rolling a rectangular plate, which has a sawtooth shape on one side and has a length longer than a width, into a cylindrical shape. This can facilitate manufacture of the bush even if the bush is thin in thickness, and greatly contribute to reducing size and weight of a fan motor.

Fifth, the bush may be formed of a metal material. According to this, the bush can dissipate heat of the bearing into the air through heat conduction during operation of the fan motor, thereby lowering temperature of the bearing.

In addition, a change in preload due to a difference of a heat transfer coefficient between the bearing and the bush do not occur. A change in an amount of preload, which is caused due to a temperature difference, can be minimized by allowing the bearing and the bush to be axially movable on the inner circumferential surface of the bearing housing.

A gap between an outer ring and a ball of the bearing and a gap between an inner ring and the ball of the bearing can be minimized, so as to minimize wear due to friction of the outer ring or ball of the bearing. This can result in delaying a reduction of a preload applied to the bearing. Therefore, a critical speed of a rotating body can be maintained when setting an initial preload amount of the rotating shaft, bearing, bush, and bearing housing, and a problem that vibration causes shortening of a lifespan of the rotating shaft or bearing or a damage on the rotating shaft or bearing can be solved.

Sixth, the bush can continuously apply an appropriate preload to the bearing while suppressing the bearing from slipping during a high-speed operation of the fan motor.

Seventh, the bush that is movable in the axial direction is coupled to the outer ring of the bearing, and the preload applying device applies an appropriate preload to the bearing in a constant pressure preloading method, which may result in reducing noise and vibration during operation. Also, the lifespan of the bearing is extended.

Eighth, the bush can be applied regardless of a material of the bearing housing. In addition, an abnormal operation of the bearing can be suppressed and reliability of a rotating body can be improved, thereby obtaining an effect of extending the lifespan of the fan motor.

DETAILED DESCRIPTION

Hereinafter, a fan motor according to an embodiment of the present disclosure will be described in detail with reference to the accompanying drawings.

In the following description, in order to clarify the characteristics of the present disclosure, descriptions of some components may be omitted.

1. Definition of Terms

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation used herein may include a plural representation unless it represents a definitely different meaning from the context.

A "fan motor" used in the following description may be understood as a concept meaning a device that suctions or blows air by rotating a fan using a power source such as an electric motor.

The term "radial" used in the following description means a shape extending like spokes from a central point in all directions.

The term "thrust" used in the following description means a force applied by a fluid such as air to an impeller in a direction opposite to an axial direction when the impeller suctions the fluid in the axial direction, namely, a force acting on the impeller or a rotating shaft on which the impeller is mounted.

The term "axial direction" used in the following description means a longitudinal direction of the rotating shaft.

The term "radial direction" used in the following description means a longitudinal direction of a line segment from a center of a circle or cylinder to a point on a circumference of a circle.

The term "axial direction" used in the following description means a direction of a circumference of a circle.

The terms "upper", "lower", "right", "left", "front", and "rear" used in the following description will be understood through the coordinate system shown in FIG. 1.

The term "axial direction" used in the following description may be understood as a concept corresponding to an up and down direction.

The term "radial direction" used in the following description may be understood as a concept corresponding to a left and right direction or a back and forth direction.

2. Description of Configuration of Fan Motor According to One Embodiment

Figure 1:
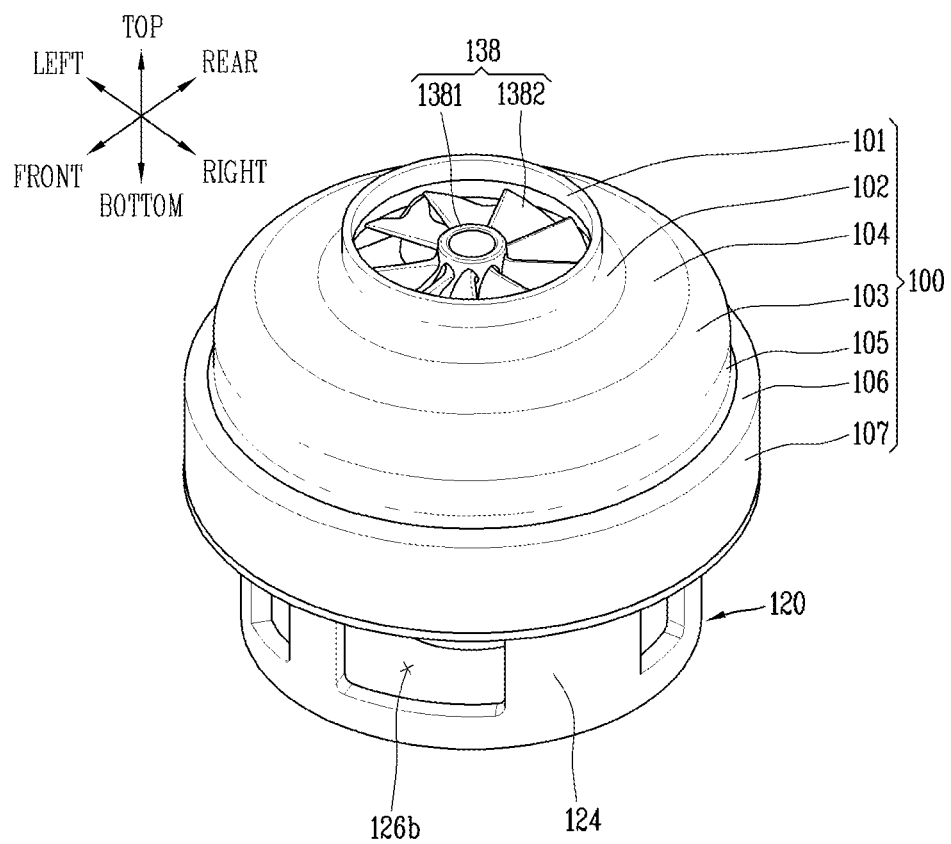
FIG. 1 is a perspective view illustrating appearance of a fan motor in accordance with the present disclosure.

FIG. 1 is a perspective view illustrating appearance of a fan motor in accordance with the present disclosure.

Figure 2:
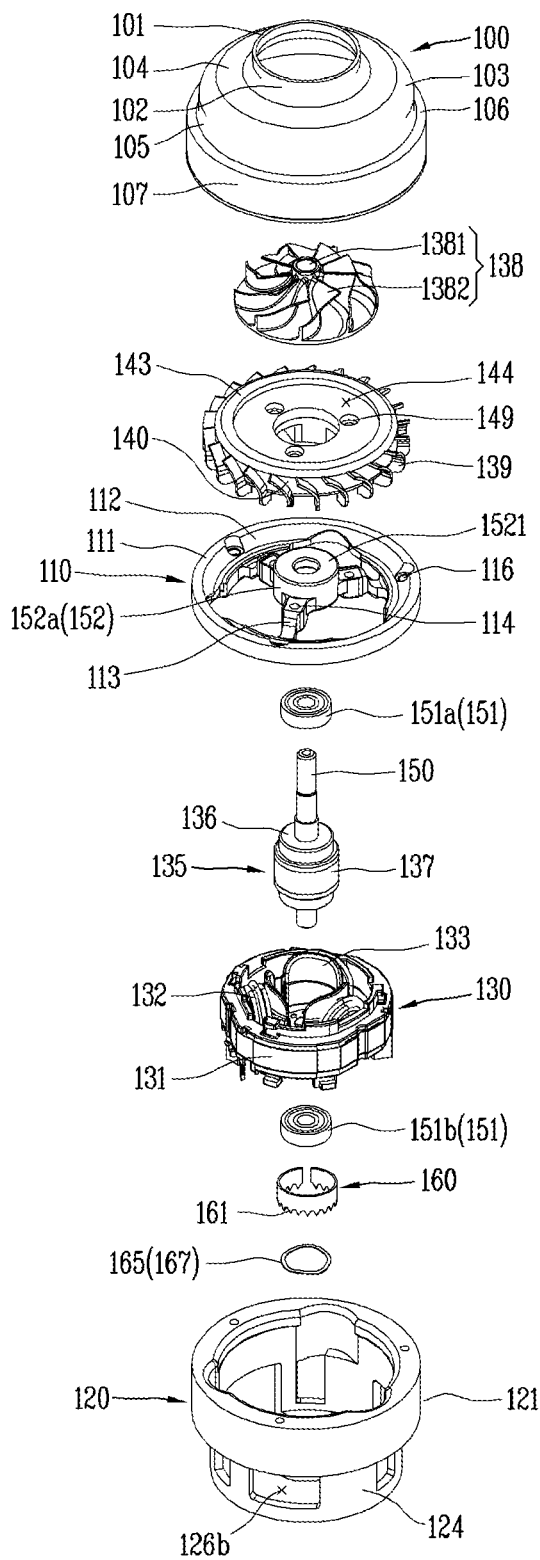
FIG. 2 is an exploded view of the fan motor of FIG. 1.

FIG. 2 is an exploded view of the fan motor of FIG. 1.

Figure 3:
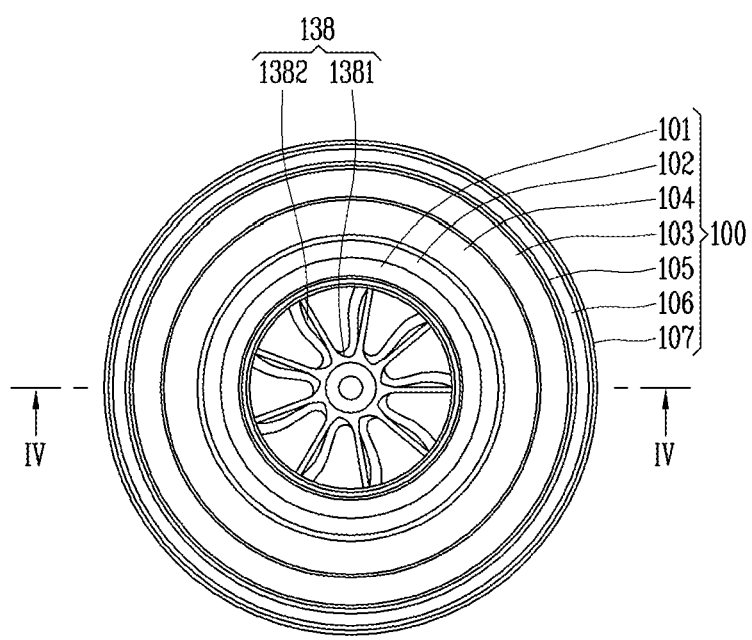
FIG. 3 is a planar view illustrating the fan motor of FIG. 1, viewed from a top.

FIG. 3 is a planar view illustrating the fan motor of FIG. 1, viewed from a top.

Figure 4:
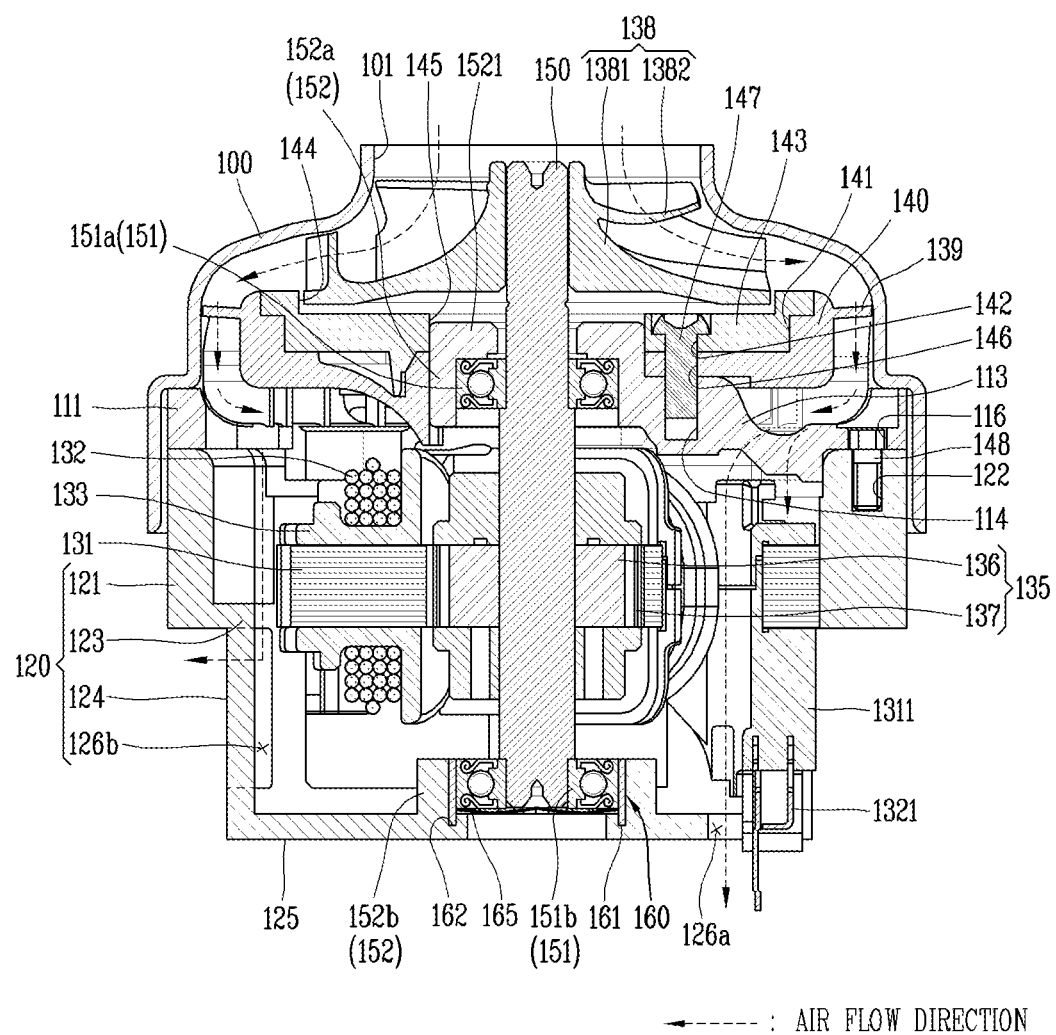
FIG. 4 is a sectional view of the fan motor taken along a line IV-XV in FIG. 3.

FIG. 4 is a sectional view of the fan motor taken along a line IV-XV in FIG. 3.

Figure 5:
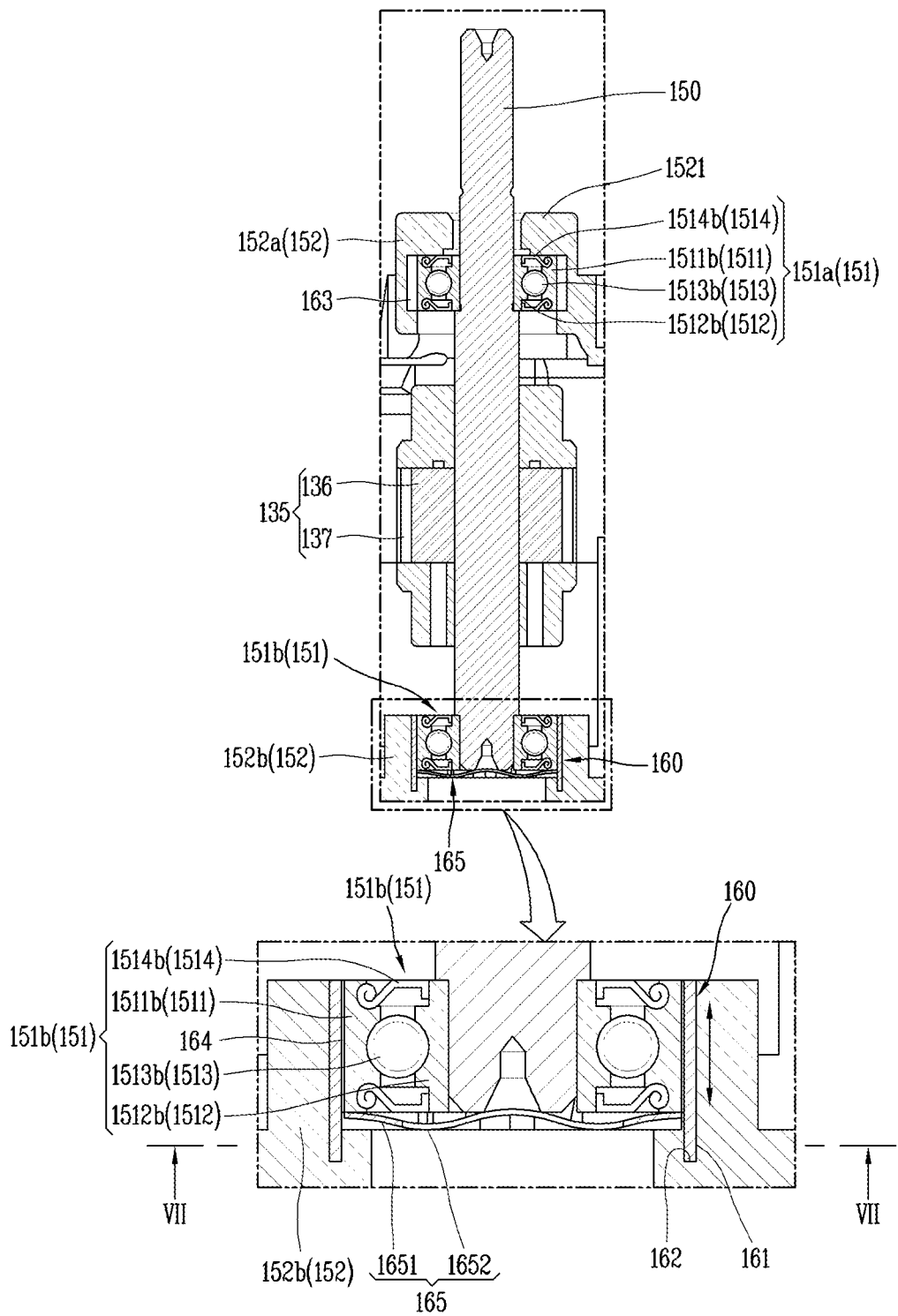
FIG. 5 is a conceptual view illustrating a state that a bush is movably disposed in an axial direction between a bearing and a bearing housing in FIG. 4.

FIG. 5 is a conceptual view illustrating a state that a bush 160 is movably disposed in an axial direction between a bearing 151 and a bearing housing 152 in FIG. 4.

Figure 6A:
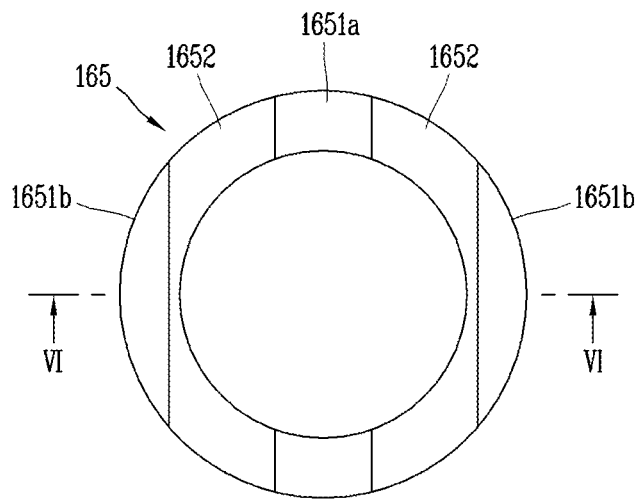
FIGS. 6A to 6C show a perspective, planar, and sectional view of a wave washer in FIG. 2.
Figure 6B:
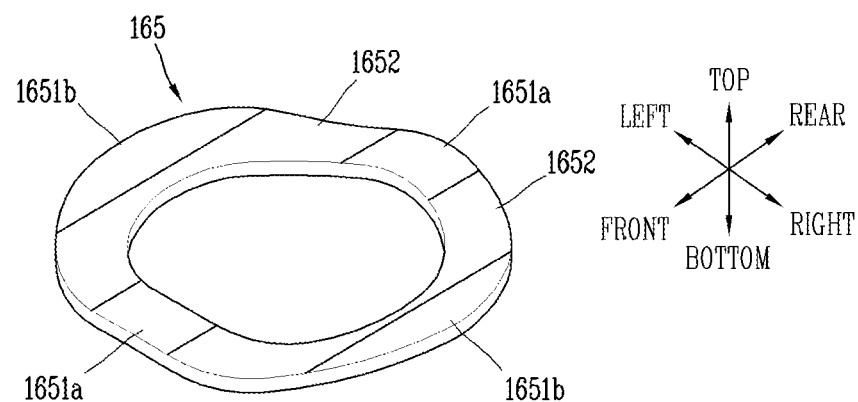
Figure 6C:
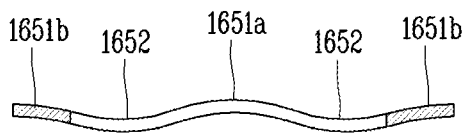

FIGS. 6A to 6C show a perspective, planar, and sectional view of a wave washer 165 in FIG. 2.

Figure 7:
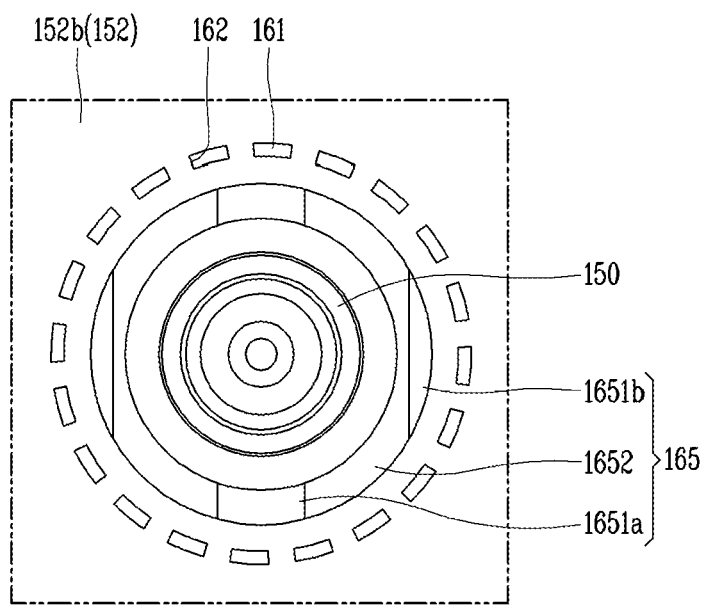
FIG. 7 is a sectional view taken along a line VII-VII in FIG. 5, which illustrates that a protrusion of the bush is accommodated in a protrusion accommodating groove of the bearing housing.

FIG. 7 is a sectional view taken along a line VII-VII in FIG. 5, which illustrates that a protrusion 161 of the bush 160 is accommodated in a protrusion accommodating groove 162 of the bearing housing 160.

Figure 8:
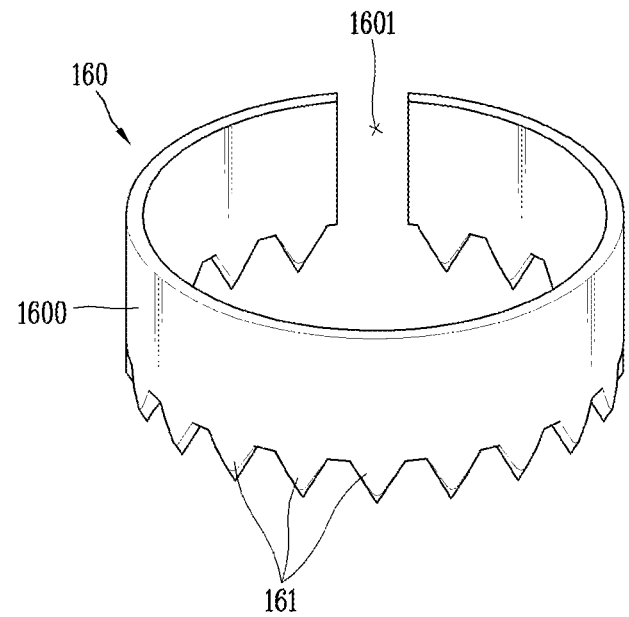
FIG. 8 is a perspective view illustrating the bush of FIG. 5.

FIG. 8 is a perspective view illustrating the bush 160 of FIG. 5.

Figure 9:
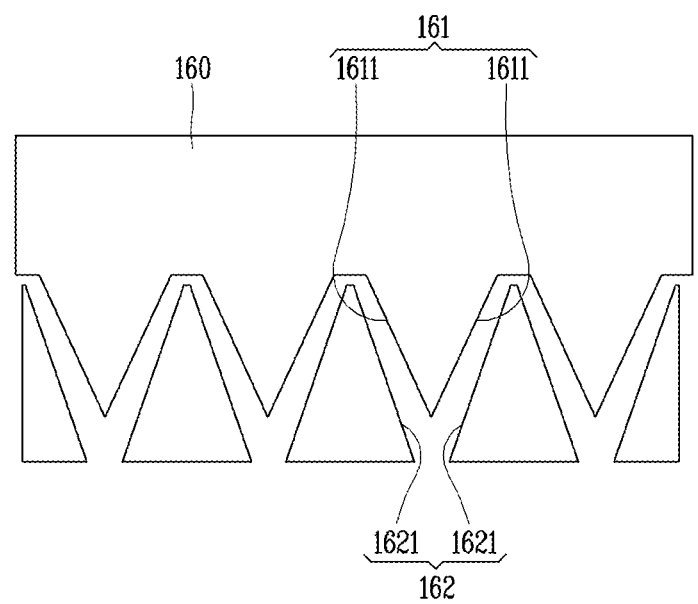
FIG. 9 is a conceptual view illustrating that the protrusion of the bush is accommodated in the protrusion accommodating groove of the bearing housing in FIG. 5.

FIG. 9 is a conceptual view illustrating that the protrusion 161 of the bush 160 is accommodated in the protrusion accommodating groove 162 of the bearing housing 152 in FIG. 5.

Figure 10:
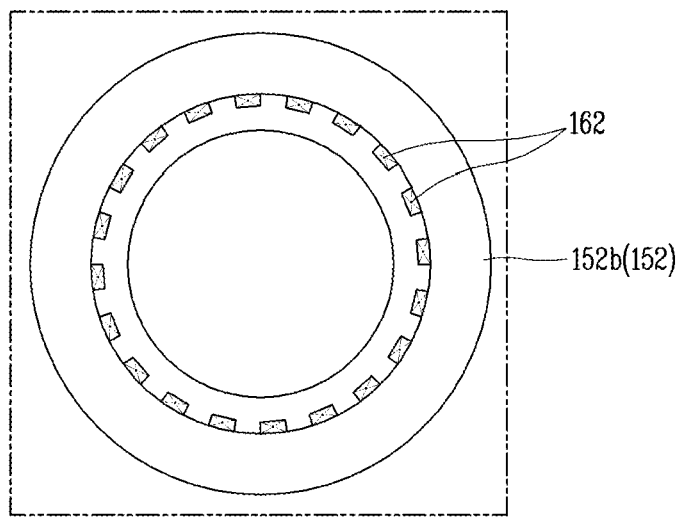
FIG. 10 is a sectional view illustrating that the protrusion accommodating groove is formed in the bearing housing in FIG. 7.

FIG. 10 is a sectional view illustrating that the protrusion accommodating groove 162 is formed in the bearing housing 152 in FIG. 7.

Figure 11:
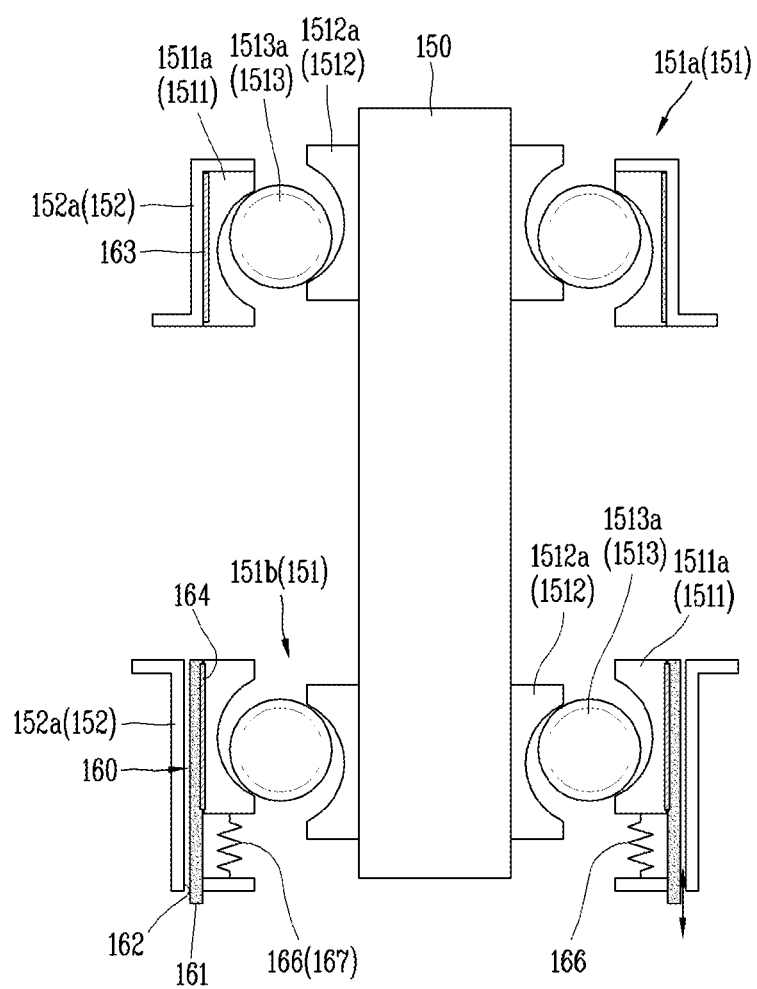
FIG. 11 is a sectional view illustrating that a preload is applied to an outer ring of the bearing of FIG. 5.

FIG. 11 is a sectional view illustrating that a preload is applied to an outer ring of the bearing 151 of FIG. 5.

The fan motor of the present disclosure may be applied to home appliances such as a handy-stick cleaner and the like.

The fan motor may mainly include a casing, an impeller 138, and a motor unit.

The casing defines appearance of the fan motor. The casing 100 includes a shroud 100, a first housing 110 and a second housing 120. The casing may be formed of a plastic material.

The shroud 100 has an accommodation space in which the impeller 138 and a vane 139 are accommodated. The shroud 100 may define appearance of the fan motor. Movement paths of air generated by the impeller 138 may be formed between the shroud 100 and the impeller 138 and between the shroud 100 and a vane hub 140 to be described later.

The shroud 100 may be formed in a cylindrical shape. The shroud 100, however, may vary in diameter along a longitudinal (lengthwise) direction of a cylinder.

Explaining a detailed configuration of the shroud 100, the shroud 100 may include a suction port 101, curved portions 102 and 103, an inclined portion 104, a linear portion 105, a radial extension portion 106, and a coupling portion 107.

The detailed configuration of the shroud 100 may be divided in an order from an upstream side to a downstream side of the shroud 100 based on an air flow direction.

A suction port 101 is located at an upstream end portion of the shroud 100. The suction port 101 is formed in a cylindrical shape. The suction port 101 has relatively short diameter and length compared to other detailed components of the shroud 100. The suction port 101 may be formed through the shroud 100 in an axial direction. One end portion of the impeller 138 may be accommodated inside the suction port 101.

Through this, air generated by the impeller 138 is suctioned through the suction port 101.

The inclined portion 104 is disposed at a downstream side of the suction port 101. The inclined portion 104 is inclined with respect to a rotating shaft 150 so that its diameter gradually increases from the upstream side to the downstream side of the shroud 100.

The curved portions 102 and 103 may include a first curved portion 102 and a second curved portion 103. The first curved portion 102 is formed in a curved shape having a preset first curvature to connect the suction port 101 and the inclined portion 104. The second curved portion 103 is formed in a curved shape having a preset second curvature to connect the inclined portion 104 and the linear portion 105.

The first curved portion 102 and the second curved portion 103 may be curved in opposite directions. The first curvature and the second curvature may be different from each other.

The linear portion 105 has a larger diameter than the inclined portion 104. The linear portion 105 is formed in a cylindrical shape. A plurality of vanes 139 to be explained later may be coupled to be contactable with an inner circumferential surface of the linear portion 105.

The radial extension portion 106 extends in the radial direction between the linear portion 105 and the coupling portion 107. The radial extension portion 106 extends along a circumferential direction of the linear portion 105.

The rotating shaft 150 is disposed in a center of the casing. The rotating shaft 150 extends along the axial direction passing through the center of the casing.

The rotating shaft 150 is accommodated inside the shroud 100. The impeller 138 is rotatably mounted on one end portion of the rotating shaft 150.

The impeller 138 includes a hub 1381 and a plurality of blades 1382.

The hub 1381 is inclined so that its diameter increases along the axial direction. The diameter of the hub 1381 gradually increases from an upstream end portion to a downstream end portion of the hub 1381 based on an air flow direction.

A shaft through-hole is formed through the hub 1381 in the axial direction such that the one end portion of the rotating shaft 150 is inserted through a central portion of the hub 1381.

Each of a plurality of blades 1382 may spirally extend along the axial direction of the hub 1381. Another end portion of the blade 1382 may protrude from one axial end of the hub 1381 in the radial direction. Another end portion of the blade 1382 may protrude from another axial end of the hub 1381 in the axial direction.

The plurality of blades 1382 are spaced apart from each other at preset intervals along the circumferential direction of the hub 1381.

With the configuration, the impeller 138 can rotate together with the rotating shaft 150. As the plurality of blades 1382 rotate at high speed together with the hub 1381, air may be moved in an inner space of the shroud 100 and thereby external air can be suctioned.

The vane 139 is disposed on an outer circumferential surface of the vane hub 140.

The vane hub 140 may be formed in a cylindrical shape. A diameter of the vane hub 140 may be larger than a maximum diameter of the hub 1381. The vane hub 140 may be formed such that a length is shorter than a diameter.

The vane 139 may be provided in plurality. The plurality of vanes 139 are disposed on an outer circumferential surface of the vane hub 140 to be spaced apart from one another in the circumferential direction. The plurality of vanes 139 protrudes radially outward from the outer circumferential surface of the vane hub 140. The plurality of vanes 139 may be inclined into a curved shape with a preset curvature.

The vane 139 may be bent (inclined) in an opposite direction to a direction in which the blade 1382 is bent (inclined). For example, based on the air flow direction, the blade 1382 may be inclined in a clockwise direction, while the vane 139 may be inclined in a counterclockwise direction.

The vanes 139 are configured to switch the air flow direction from the radial direction to the axial direction. Through this, air generated by the impeller 138 may be guided by the vane 139 and flow in the axial direction.

A bearing through hole may be formed through a central portion of the vane hub 140 such that a first bearing housing 152a, which will be described later, is inserted. The central portion of the vane hub 140 surrounds the first bearing housing 152a inserted through the bearing through hole.

A first recess 141 may be recessed in one axial side surface of the vane hub 140. The first recess 141 surrounds rim and lower surface of a vane cover 143.

The vane cover 143 may be inserted into the first recess 141 to cover an upper surface of the vane hub 140. A height of an edge portion of the vane cover 143 may correspond to a recessed depth of the vane hub 140 in the axial direction.

With the configuration, as the upper surface of the edge portion of the vane cover 143 is located on the same plane as the upper surface of the vane hub 140, flow resistance acting on air which is suctioned through the suction port 101 can be minimized while the air moves from the impeller 138 to the vane 139.

A second recess 144 may be recessed in one axial side surface of the vane cover 143. An outer end portion of the hub 1381 is accommodated in the second recess 144. The second recess 144 is formed to surround the rim and the lower surface of the hub 1381 at a preset interval from the hub 1381 in the axial and radial directions.

An outer end portion of the hub 1381 can be located on the same plane as the upper surface of the edge of the vane cover 143 based on the lower surface of the second recess 144, thereby minimizing flow resistance of air suctioned through the suction port 101 when the air flows from the impeller 138 to the vanes 139.

A stopper accommodating hole 145 may be formed in the central portion of the vane cover 143 such that a stopper 1521 to be described later is inserted therein. The central portion of the vane cover 143 surrounds the stopper 1521 inserted in the stopper accommodating hole 145.

A plurality of fastening holes 142 and 146 may be formed through each of the vane cover 143 and the vane hub 140 in the axial direction. The plurality of first fastening holes 142 formed through the vane cover 143 and the plurality of second fastening holes 146 formed through the vane cover 143 are disposed to overlap each other in the axial direction. The plurality of first and second fastening holes 142 and 146 are spaced apart from each other in the circumferential direction.

First fastening members 147 such as screws are fastened to the vane cover 143 and the vane hub 140 through the first fastening holes 142 and the second fastening holes 146. Through this, the vane cover 143 and the vane hub 140 may be coupled to each other.

Accommodation grooves 149 may be formed in a bottom surface of the vane cover 143 so that screw heads of the first fastening members 147 are accommodated therein.

An outer diameter of each of the plurality of vanes 139 that radially protrude from the outer circumferential surface of the vane hub 140 may correspond to an inner diameter of the linear portion 105 of the shroud 100. Accordingly, outer ends of the plurality of vanes 139 may be press-fitted to an inner circumferential surface of the linear portion 105 of the shroud 100.

In addition, the vane hub 140 may be fixed to the shroud 100 by the plurality of vanes 139, and coupled to the first bearing housing 152a to enclose the first bearing housing 152a, so as to support the first bearing housing 152a.

The rotating shaft 150 is disposed inside the shroud 100 to be rotatable relative to the shroud 100.

The bearing 151 is provided to rotatably support the rotating shaft 150. The bearing 151 may be provided in plurality.

The plurality of bearings 151 may include a first bearing 151a and a second bearing 151b. The first bearing 151a may be disposed adjacent to the impeller.

The first bearing 151a and the second bearing 151b are mounted on both sides of the rotating shaft 150 with the motor unit, which will be described later, interposed therebetween.

A first bearing support portion is disposed on one side of the rotating shaft 150. A second bearing support portion is disposed on another side of the rotating shaft 150.

The impeller support portion is disposed on one end portion of the rotating shaft 150. The first bearing support portion may have the same diameter as the impeller support portion.

A rotor support portion is disposed on the rotating shaft 150. The rotor support portion may extend in the axial direction between the first bearing support portion and the second bearing support portion.

Diameters of the first bearing support portion and the second bearing support portion are smaller than a diameter of the rotor support portion.

A first stepped jaw formed between the first bearing support portion and the rotor support portion may restrict the first bearing 151a from moving toward the rotor 135 in the axial direction.

A second stepped jaw formed between the second bearing support portion and the rotor support portion may restrict the second bearing 151b from moving toward the rotor 135 in the axial direction.

The following description of the bearing 151 may be equally applied to each of the first bearing 151a and the second bearing 151b, unless otherwise specified.

The bearing 151 may be implemented as a ball bearing. The ball bearing supports a radial load of the rotating shaft 150. The bearing 151 may include an outer ring 1511, an inner ring 1512, a plurality of balls 1513, and a plurality of covers 1514 (see FIG. 10).

The outer ring 1511 is formed in a cylindrical shape. The bearing housing 152 may be formed to surround the outer ring 1511. The inner ring 1512 is formed in a cylindrical shape. The inner ring 1512 is disposed inside the outer ring 1511 to surround the bearing support portion.

The plurality of balls 1513 are disposed between the outer ring 1511 and the inner ring 1512.

Ball accommodating grooves are concavely formed on the outer ring 1511 and the inner ring 1512, respectively. The ball accommodating grooves have an arcuate curved surface. The ball accommodating grooves extend along the outer ring 1511 and the inner ring 1512, respectively, in the circumferential direction. The ball accommodating groove of the outer ring 1511 and the ball accommodating groove of the inner ring 1512 are disposed to face each other.

The plurality of balls 1513 are spaced apart at preset intervals in the circumferential direction of the outer ring 1511 and the inner ring 1512.

The plurality of balls 1513 roll in contact between the ball accommodating groove of the outer ring 1511 and the ball accommodating groove of the inner ring 1512. The inner ring 1512 performs rotational motion relative to the outer ring 1511 by the balls 1513. The inner ring 1512 rotates together with the rotating shaft 150.

The plurality of covers are coupled to cover both sides of the outer ring and the inner ring in the axial direction, respectively.

With the configuration, the plurality of bearings 151 can stably and rotatably support the both sides of the rotating shaft 150.

A bearing housing 152 is formed in a cylindrical shape. A bearing accommodating hole is formed through the center of the bearing housing 152 in the axial direction. The bearing 151 is accommodated in the bearing housing 152 through the bearing accommodating hole.

The first bearing housing 152a encloses and accommodates the first bearing 151a. The second bearing housing 128 encloses and accommodates the second bearing 151b.

The first housing 110 is fixedly inserted into the shroud 100.

The first housing 110 is disposed at a downstream side of the vane 139 based on the air flow direction.

The first housing 110 includes a first bearing housing 152a, a plurality of first bridges 113, and a first coupling ring 111.

The first bearing housing 152a is disposed inside the first coupling ring 111. The first coupling ring 111 is formed in a ring shape. An outer diameter of the first coupling ring 111 corresponds to an inner diameter of the coupling portion 107 of the shroud 100.

The first coupling ring 111 may be press-fitted to the inner circumferential surface of the coupling portion 107 of the shroud 100. The first coupling ring 111 is fitted to the inner circumferential surface of the shroud 100.

An inner diameter of the first coupling ring 111 is larger than a diameter of the first bearing housing 152a. The first bearing housing 152a is disposed inside the first coupling ring 111.

The plurality of first bridges 113 extend radially between an inner circumferential surface of the first coupling ring 111 and an outer circumferential surface of the first bearing housing 152a. An outer end portion of the first bridge 113 is connected to the first coupling ring 111, and an inner end portion of the first bridge 113 is connected to the first bearing housing 152a.

A flow guide 112 is disposed on the inner circumferential surface of the first coupling ring 111. The flow guide 112 guides air, which has passed through the vane 139, to the inside of the motor unit.

The flow guide 112 is formed in a curved shape with a preset curvature.

The flow guide 112 protrudes radially from the inner circumferential surface of the first coupling ring 111.

One axial end of the flow guide 112 comes in contact with the radial extension portion 106. An inner diameter of the one axial end of the flow guide 112 may correspond to an inner diameter of the linear portion 105.

Another axial end of the flow guide 112 comes into contact with one axial end of the second housing 120 to be described later. An inner diameter of the another axial end of the flow guide 112 may correspond to an inner diameter of the one axial end of the second housing 120.

An inner diameter of the radial extension portion 106 may be larger than the inner diameter of the one axial end of the second housing 120, based on the inner circumferential surface of the coupling portion 107.

A radial protrusion length of the another axial end of the flow guide 112 may be longer than a radial protrusion length of the one axial end of the flow guide 112.

An inner circumferential surface of the flow guide 112 has an arcuate cross-sectional shape. The inner diameter of the flow guide 112 may gradually decrease from the one axial end to the another axial end of the flow guide 112.

The inner circumferential surface of the flow guide 112 is made to connect the linear portion 105 to the one axial end of the second housing 120.

According to this, the flow guide 112 can minimize flow resistance of air that has passed through the vane 139.

The first bridges 113 are disposed at the downstream side of the vane hub 140 based on the air flow direction. The first bridges 113 may be fastened to the vane hub 140.

A first fastening groove 114 is formed in an inner end portion of each of the first bridges 113. The first fastening groove 114 is disposed to overlap the first fastening hole 142 of the vane cover 143 and the second fastening hole 146 of the vane hub 140 in the axial direction. The first fastening member 147 such as a screw is fastened to the first fastening groove 114 through the first and second fastening holes 142 and 146.

Accordingly, the first bridge 113 and the vane hub 140 are coupled to each other.

As the impeller 138 rotates, external air is suctioned from the suction port 101 toward the coupling portion 107 in a first axial direction. At this time, the suctioned air applies a thrust that is as strong as suction force of the impeller 138 to the impeller 138 and the rotating shaft 150 in a second axial direction opposite to the first axial direction.

The first bearing 151a may be moved by the thrust, which is applied to the rotating shaft 150, in the second axial direction which is opposite to a suction direction of the air.

To solve this problem, a stopper 1521 is disposed on one axial end of the first bearing housing 152a. The stopper 1521 extends radially from the one axial end of the first bearing housing 152a so as to cover the one axial end of the first bearing 151a.

A shaft through hole is formed through a central portion of the stopper 1521 in the axial direction. The shaft through hole has a diameter that is slightly larger than the diameter of the rotating shaft 150.

With this configuration, the stopper 1521 can restrict the first bearing 151a from being moved in the second axial direction by the thrust.

The thrust acting on the rotating shaft 150 is transmitted to the first housing 110 through the first bearing 151a, the first bearing housing 152a, the first bridge 113, and the first coupling ring 111.

The first housing 110 may be referred to as a load-side housing in that it is located on one side of the rotating shaft 150 on which the thrust acts.

The second housing 120 may be referred to as an opposite load-side housing in that it is located on the opposite side of the load-side housing.

The second housing 120 may be inserted into the shroud 100.

The second housing 120 is disposed at a downstream side of the first housing 110 based on the air flow direction.

The second housing 120 includes a second coupling ring 121, an accommodating portion 124, a second bearing housing 152b, and a second bridge 125.

The second coupling ring 121 is formed in a circular ring shape. The second coupling ring 121 is disposed to face the first coupling ring 111.

An outer diameter of the second coupling ring 121 corresponds to the inner diameter of the coupling portion 107 of the shroud 100. The second coupling ring 121 may be press-fitted to the inner circumferential surface of the coupling portion 107 of the shroud 100.

The first coupling ring and the second coupling ring 111 may be formed to have different radial widths. For example, the radial width of the second coupling ring 121 may be larger than the radial width of the first coupling ring 111.

The radial width of the second coupling ring 121 may be larger than or equal to the radial width of the another axial end of the flow guide 112. The radial width of the second coupling ring 121 is formed constant along the axial direction.

An inner edge of the one axial end of the second coupling ring 121 is formed in a curved shape. This can minimize flow resistance of air that is introduced into the second coupling ring 121 from the flow guide 112.

The second coupling ring 121 defines an accommodation space therein to accommodate a stator core 131 of the motor unit, which will be described later.

A protrusion rib 115 protrudes from the another end of the first bridge 113 into the inner accommodation space of the second coupling ring 121. The protrusion rib 115 may protrude in a direction opposite to the first coupling ring 111. The outer circumferential surface of the protrusion rib 115 is formed to be in surface contact with the inner circumferential surface of the second coupling ring 121.

A coupling hole 116 is formed through an outer end portion of each of the first bridges 113 in the axial direction. The coupling hole 116 has a diameter smaller than a circumferential width of the first bridge 113.

The coupling hole 116 is disposed between the first coupling ring 111 and the protrusion rib 115. The plurality of coupling holes 116 are spaced apart from one another at equal intervals along the circumferential direction of the flow guide 112. In this embodiment, the plurality of coupling holes 116 are spaced apart from one another at intervals of 120 degrees.

With this configuration, the protrusion rib 115 can reinforce strength of the first bridge 113 that is reduced due to the coupling hole 116. In addition, the protrusion rib 115 may protrude to be fitted to the inner circumferential surface of the second coupling ring 121 so as to improve an assembling property between the first housing 110 and the second housing 120.

A plurality of second fastening grooves 122 may be formed in one axial end of the second coupling ring 121. The second fastening grooves 122 are located to overlap the coupling holes 116 in the axial direction.

A second fastening member 148, such as a screw, is fastened to the first bridge 113 and the second fastening ring 121 through the coupling hole 116 and the second fastening groove 122. Through this, the first housing 110 and the second housing 120 are fastened to each other by the second fastening member 148.

The second bearing housing 152b is formed in a cylindrical shape. The second bearing housing 128 has an accommodation space therein to accommodate the second bearing 151b. The second bearing housing 152b is formed in a penetrating manner in the axial direction. The second bearing housing 152b may surround the second bearing 151b.

The accommodating portion 124 is disposed at a downstream side of the second coupling ring 121. The accommodating portion 124 is made to accommodate a portion of the motor unit, for example, the coil 132 of the stator 130 and the second bearing housing 152b, which will be described later.

The accommodating portion 124 is formed in a cylindrical shape. A diameter of the accommodating portion 121 is smaller than a diameter of the second coupling ring 121 and larger than a diameter of the second bearing housing 152b.

One axial end of the accommodating portion 124 may be connected to another axial end of the second coupling ring 121.

A radial reduction portion 123 extends in the radial direction between the another axial end of the second coupling ring 121 and the one axial end of the accommodating portion 124. The radial reduction portion 123 connects the another axial end of the second coupling ring 121 and the one axial end of the accommodating portion 124.

The second bearing housing 152b is disposed inside the accommodating portion 124. The second bearing housing 152b is disposed at a downstream side of the coil 132 of the stator 130 based on the air flow direction.

The second bridge 125 may extend radially between the accommodating portion 124 and the second bearing housing 152b. An outer end portion of the second bridge 125 may be connected to another axial end portion of the accommodating portion 124. An inner end portion of the second bridge 125 may be connected to an outer circumferential surface of the second bearing housing 152b.

The inner end portion of the second bridge 125 may be connected to another axial end of the second bearing housing 152b. The second bridge 125 may be provided in plurality. The plurality of second bridges 125 may be spaced apart from one another in the circumferential direction of the second bearing housing 152b.

A plurality of first discharge holes 126a may be formed between the plurality of second bridges 125 adjacent to each other in the circumferential direction to allow air to flow to the outside. The plurality of first discharge holes 126a and the plurality of second bridges 125 are alternately disposed to be spaced apart from each other in the circumferential direction.

According to this, air passing through the accommodating portion 124 may flow out in the axial direction through the plurality of first discharge holes 126a.

A plurality of second discharge holes 126b may be radially formed through a side surface of the accommodating portion 124. The plurality of second discharge holes 126b may be spaced apart from one another in the circumferential direction. According to this, air can be discharged radially from the inside of the accommodating portion 124.

The motor unit receives electrical energy to rotate the rotating shaft 150 and rotates the impeller 138 mounted on one end portion of the rotating shaft 150.

To this end, the motor unit includes a rotor 135 and a stator 130.

The rotor 135 includes a rotor core 136 and permanent magnets 137.

The rotor core 136 may be formed by stacking a plurality of electrical steel sheets which is thin in the axial direction. The rotor core 136 is formed in a cylindrical shape. A shaft through hole is formed through a central portion of the rotor core 136. The shaft through hole is formed through the rotor core 136 in the axial direction.

The rotor core 136 is mounted on the rotating shaft 150. A rotor support portion is disposed on the rotating shaft 150. The rotating shaft 150 includes a first bearing support portion and a second bearing support portion. The rotor support portion is disposed between the first bearing support portion and the second bearing support portion. A diameter of the rotor support portion may be larger than diameters of the first bearing support portion and the second bearing support portion.

The rotor 135 may be disposed between the first bearing 151a and the second bearing 151b.

The permanent magnet 137 may be disposed inside the rotor core 136 or may be mounted on an outer circumferential surface of the rotor core 136. In the embodiment of the present disclosure, the permanent magnet 137 is shown mounted on the outer circumferential surface of the rotor core 136.

The stator includes a stator core 131 and a coil 132.

The stator core 131 may be formed by stacking a plurality of electrical steel sheets which is thin in the axial direction. The stator core 131 is formed in a cylindrical shape. A rotor through hole is formed through a central portion of the rotor core 136. The rotor through hole is formed through the stator core 131 in the axial direction.

A diameter of the rotor through-hole is slightly larger than the diameter of the permanent magnet 137. The permanent magnet 137 may maintain a preset distance (air gap) from an inner circumferential surface of the stator core 131.

The stator core 131 includes a back yoke, a plurality of slots, and a plurality of teeth.

The back yoke is formed in a cylindrical shape.

The plurality of teeth are formed to protrude from the back yoke toward the rotating shaft 150 in the radial direction. Pole shoes may protrude in the circumferential direction from inner end portions of the plurality of teeth.

The plurality of slots are formed through the stator core 131 in the axial direction. The plurality of teeth and the plurality of slots each are alternately arranged in a spaced manner in the circumferential direction of the stator core 131. The embodiment of the present disclosure illustrates three slots and three teeth.

The plurality of teeth and the plurality of slots each may be spaced apart from one another at intervals of 120 degrees in the circumferential direction.

The plurality of coils 132 may be wound around the stator core 131 through the plurality of slots. The embodiment illustrates three coils 132. Three-phase AC currents may be applied to the three coils 132.

The stator 130 is provided with a plurality of connectors 1311 so that external three-phase AC power is supplied to the coils 132. The embodiment of the present disclosure illustrates three connectors 1311 which are provided one by one for each phase.

The connectors 1311 electrically connect external three-phase AC power source and the coils 132. The connectors 1311 extend axially downward from the stator core 131.

A plurality of lead wires 1321 protrude from lower sides of the connectors 1311 in the axial direction to be exposed to the outside.

Connector accommodating holes are formed in the accommodating portion 124 to accommodate the connectors 1311.

Insulators 133 are disposed for electrical insulation between the coils 132 and the stator core 131. The insulator 133 may be formed of a nonconductor.

The insulator 133 may be disposed between the coil 132 and the stator core 131 to block current from flowing between the coil 132 and the stator core 131.

The plurality of coils 132 and the plurality of insulators 133 may be spaced apart from each other at intervals of 120 degrees along the circumferential direction of the stator core 131.

The first bridge 113 is located above the motor unit. The first bridge 113 and the coil 132 (or tooth) may be disposed not to overlap each other in the axial direction. The first bridges 113 do not hinder the flow of air guided by the flow guide 112 from the vanes 139.

The second bridge 125 is located below the motor unit. The second bridge 125 and the coil 132 (or tooth) may overlap each other in the axial direction.

The first bearing 151*a* and the second bearing 151*b* respectively supporting both sides of the rotating shaft 150 are supported by the first housing 110 and the second housing 120 which are different from each other.

Each of the first housing 110 and the second housing 120 is formed in a cylindrical shape. The first and second housings 120 have the same outermost diameter. The first and second housings 110 and 120 are press-fitted to the inner circumferential surface of the coupling portion 107 of the single shroud 100 and may be axially fastened to each other.

A preload applying device 167 (see FIG. 11) may be disposed inside the bearing housing 152. The preload applying device 167 is a device that presses in advance (preloads) the bearing 151 accommodated in the bearing housing 152 in the axial direction.

The preload applying device 167 may pressurize the bearing 151 in advance by using elastic force. Here, the preload applying device 167 refers to a device that presses the bearing 151 in advance when assembling the bearing 151, the rotating shaft 150, and the bearing housing 152 before operating the fan motor.

The preload applying device 167 may be implemented as a spring 166 (see FIG. 11) or a wave washer 165.

The embodiment of the present disclosure illustrates that the preload applying device 167 is implemented as a wave washer 165.

The wave washer 165 may be formed in a circular ring shape. The wave washer 165 may include a plurality of first curved portions 102 and second curved portions 1652.

The wave washer 165 comes into contact with the outer ring 1511 of the bearing 151 to apply axial force to the outer ring 1511. In the embodiment of the present disclosure, the wave washer 165 is brought into contact with the second outer ring 1511*b* of the second bearing 151*b*.

The first curved portion 1651 may be convex with a preset curvature in the second axial direction. The first curved portion 1651 may be referred to as a convex portion.

The second curved portion 1652 may be concave with a preset curvature in the first axial direction. The second curved portion 1652 may be referred to as a concave portion.

Here, the first axial direction is an axial direction from the impeller 138 toward the motor unit. The second axial direction is opposite to the first axial direction and is an axial direction from the motor unit to the impeller 138. The second axial direction is the same as a direction that a thrust acts.

The first curved portions 1651 and the second curved portions 1652 are alternately disposed along the circumferential direction. The first curved portions 1651 and the second curved portions 1652 are continuously disposed along the circumferential direction.

In the embodiment disclosed herein, the plurality of first curved portions 1651 may be provided by two pairs and the plurality of second curved portions 1652 may be provided by one pair.

Among the two pairs of first curved portions 1651, one pair of first curved portions 1651*a* may face each other in a first diametrical direction of the wave washer 165. Among the two pairs, another pair of first curved portions 1651*b* may be disposed to face each other in a second diametrical direction of the wave washer 165. Here, the first diametrical direction and the second diametrical direction are perpendicular to the axial direction. The first diametrical direction and the second diametrical direction are perpendicular to each other on the same plane. The first diametrical direction may be parallel to the front and rear direction. The second diametrical direction may be parallel to the left and right direction.

The one pair of first curved portions 1651*a* facing each other in the first diametrical direction have a constant radial width along the circumferential direction.

A width of the another pair of first curved portions 1651*b* facing each other in the second diametrical direction gradually decreases from the center of the first curved portion 1651*b* to front and rear sides.

The plurality of first curved portions 1651*a* and 1651*b* may be disposed to be in contact with the second outer ring 1511*b* of the second bearing 151*b*.

The plurality of second curved portions 1652 may be disposed to face each other in a direction parallel to the first diametrical direction of the wave washer 165.

The plurality of first curved portions 1651 and the plurality of second curved portions 1652 may be symmetrically formed with respect to the first diametrical direction or the second diametrical direction.

The plurality of second curved portions 1652 may be formed so that a width thereof in the front and rear direction increases in the left and right direction from a first diametrical center line passing through the center of the first curved portion 1651 and the center of the wave washer 165 in the radial direction.

The wave washer 165 may be disposed between the one axial end of the second bearing 152*b* and an inner surface of the second bearing housing 152*b*. The wave washer 165 may be in contact with the outer ring 1511 of the second bearing 151*b* to apply a preload in the axial direction.

To reduce the size and weight of the fan motor, the bearing housing 152 may be made of a plastic material. For example, the bearing housing 152 may be molded by injecting a plastic material. However, the bearing housing 152 is not limited to a plastic material and may be formed of a metal material.

A bush 160 may be disposed between the bearing 151 and the bearing housing 152.

The bush 160 includes a bush body 1600 and a plurality of protrusions 161.

The bush body 1600 may be formed in a cylindrical shape or a ring shape. The bush body 1600 may surround the outer ring 1511 of the bearing 151. A diameter of the bush body 1600 may be slightly larger than or equal to a diameter of the outer ring 1511.

An inner diameter of the bush body 1600 may correspond to an outer diameter of the outer ring 1511. An inner circumferential surface of the bush 160 may come into contact with an outer circumferential surface of the outer ring 1511. An axial length of the bush body 1600 may be equal to or longer than an axial length of the bearing 151.

A thickness is generated between an outer circumferential surface and the inner circumferential surface of the bush body 1600. The thickness of the bush body 1600 may be constant along the circumferential direction.

The bush 160 may be formed of a metal material having a high heat transfer coefficient. The bush 160 may transfer heat generated in the bearing 151 to the bearing housing 152 or dissipate the heat into the air.

The bush body 1600 may be formed by rolling a rectangular plate material into a cylindrical shape. A circumferential length of the bush body 1600 may be longer than an axial length of the bush 160. The circumferential length of the bush body 1600 may be shorter than a circumferential length of the outer ring 1511 of the bearing 151. An opening 1601 may be formed through one side of the bush body 1600. The opening 1601 may formed through the bush 160 in the radial and axial directions of the bush 160. A circumferential length of the opening 1601 may be set in the range of 30% or less of the circumferential length of the bush body 1600. The circumferential length of the opening 1601 is shorter than the axial length of the bush body 1600.

According to this configuration, since the bush 160 is formed by rolling a plate material, measurements of diameter and thickness of the bush 160 can be more accurate and precise, compared to a closed-loop cylindrical bush. Also, a machining cost of the bush 160 can be reduced.

The outer ring 1511 of the bearing 151 may be adhered onto the inner circumferential surface of the bush 160. An adhesive may be applied between the outer ring 1511 of the bearing 151 and the bush 160. An adhesive layer may be formed between the outer circumferential surface of the outer ring 1511 of the bearing 151 and the inner circumferential surface of the bush 160.

An uneven portion is disposed between one axial end of the bush body 1600 and an inner surface of the bearing housing 152.

The uneven portion may include protrusions 161 or protrusion accommodating grooves 162. Alternatively, the uneven portion may include the protrusions 161 and the protrusion accommodating grooves 162.

According to the embodiment of the present disclosure, the protrusions 161 may protrude from the one axial end of the bush body 1600 in the axial direction, and the protrusion accommodating grooves 162 may be recessed into the inner surface of the bearing housing 152 in the axial direction.

Here, the inner surface of the bearing housing 152 indicates a surface facing the one axial end of the bush body 1600 in the axial direction.

According to another embodiment of the present disclosure, the protrusion accommodating grooves may be recessed into the one axial end of the bush body in the axial direction, and the protrusions may protrude from the inner surface of the bearing housing in the axial direction.

According to still another embodiment of the present disclosure, first protrusions and second protrusion accommodating grooves may be alternately disposed on the one axial end of the bush body 1600 along the circumferential direction. First protrusion accommodating grooves and second protrusions may be alternately disposed on the inner surface of the bearing housing 152 along the circumferential direction. The first protrusions and the first protrusion accommodating grooves may be disposed to face each other in the axial direction, and the first protrusions may be inserted into the first protrusion accommodating grooves. The second protrusions and the second protrusion accommodating grooves may be disposed to face each other in the axial direction, and the second protrusions may be inserted into the second protrusion accommodating grooves.

The bearing housing 152 surrounds the outer circumferential surface of the bush 160. An inner diameter of the bearing housing 152 may correspond to an outer diameter of the bush 160. The bearing housing 152 may limit a radial movement of the bush 160.

The bush 160 may be coupled by being received in the inner surface of the bearing housing 152 in the axial direction. The protrusion 161 may be coupled by being inserted into the protrusion accommodating groove 162 in the axial direction.

A plurality of first inclined surfaces 1611 may be formed on both sides of the protrusion 161. The first inclined surfaces 1611 may be inclined at a preset angle with respect to the axial direction. The plurality of first inclined surfaces 1611 may be formed symmetrically in the circumferential direction based on an axial center line passing through the center of the protrusion 161 in the axial direction. The plurality of first inclined surfaces 1611 may intersect at one point.

A plurality of second inclined surfaces 1621 may be formed on both sides of the protrusion accommodating groove 162. The second inclined surfaces 1621 may be inclined at a preset angle with respect to the axial direction. The plurality of second inclined surfaces 1621 may be continuously formed in the circumferential direction. The plurality of second inclined surfaces 1621 may intersect at one point.

The plurality of second inclined surfaces 1621 adjacent to each other in the circumferential direction may be formed symmetrically in the circumferential direction with respect to the axial center line.

The first inclined surface 1611 and the second inclined surface 1621 may face each other in the axial direction. The first inclined surface 1611 and the second inclined surface 1621 may be disposed to overlap each other in the axial direction.

The first inclined surface 1611 or the second inclined surface 1621 may be replaced with a first curved portion 1651 or a second curved portion 1652 formed in a curved shape.

The protrusion accommodating groove 162 may be replaced with a protrusion accommodating hole or a protrusion accommodating opening formed through the bearing housing 152 in the axial direction.

At least one protrusion 161 may be provided on the one axial end of the bush 160. The protrusion accommodating groove 162 may be provided in plurality on the inner surface of the bearing housing 152. The number of protrusion accommodating grooves 162 may be greater than the number of protrusions 161.

The protrusion 161 may be formed in any one of a triangular shape, a rectangular shape, and a semicircular shape. The embodiment of the present disclosure illustrates the protrusion 161 formed in the triangular shape.

The protrusion 161 and the protrusion accommodating groove 162 may be engaged with each other by the first inclined surface 1611 and the second inclined surface 1621.

Since the first and second inclined surfaces 1611 and 1621 intersects with each other at one point to form a vertex of a triangle, the protrusion 161 of the bush 160 can be easily slid toward the protrusion accommodating groove 162 of the bearing housing 152 along the inclined surfaces even though the protrusion 161 and the protrusion accommodating groove 162 are not accurately aligned with each other in the axial direction.

The bush 160 may be installed any one of the first bearing housing 152a and the second bearing housing 152b.

In the embodiment of the present disclosure, the bush 160 is disposed on the inner circumferential surface of the second bearing housing 152b.

In order to prevent the first outer ring 1511a of the first bearing 151a from slipping on the inner circumferential surface of the first bearing housing 152a, the first outer ring 1511a may be adhered onto the inner circumferential surface of the first bearing housing 152a by an adhesive. A first adhesive layer 163 on which the adhesive is applied may be formed on the outer circumferential surface of the first outer ring 1511a.

To prevent the second outer ring 1511b of the second bearing 151b from slipping on the inner circumferential surface of the second bearing housing 152b, the second outer ring 1511b may not be adhered onto the inner circumferential surface of the second bearing housing 152b but be adhered onto the inner circumferential surface of the bush 160 by an adhesive. A second adhesive layer 164 on which the adhesive is applied may be formed on the outer circumferential surface of the second outer ring 1511b.

As the protrusion 161 of the bush 160 is coupled to be engaged with the protrusion accommodating groove 162 of the second bearing housing 152b, the bush 160 can suppress the second bearing 151b from slipping on the inner circumferential surface of the second bearing housing 152b in the circumferential direction.

However, the bush 160 is accommodated to be movable on the inner circumferential surface of the second bearing housing 152b in the axial direction.

Hereinafter, operations of the bush 160 and the preload applying device 167 according to the present disclosure will be described.

The first bearing 151a and the second bearing 151b may be press-fitted to both sides of the rotating shaft 150. Accordingly, the first inner ring 1512a of the first bearing 151a and the second inner ring 1512b of the second bearing 151b are fixed to the rotating shaft 150. The first inner ring 1512a and the second inner ring 1512b may rotate together with the rotating shaft 150. In addition, the rotating shaft 150, the first inner ring 1512a, and the second inner ring 1512b may move together in the axial direction.

The first outer ring 151a of the first bearing 151a is fixedly adhered to the inner circumferential surface of the first bearing housing 152a. The first adhesive layer 163 may be formed between the first outer ring 1511a of the first bearing 151a and the inner circumferential surface of the first bearing housing 152a. Accordingly, the first outer ring 1511a of the first bearing 151a can be suppressed from slipping on the inner circumferential surface of the first bearing housing 152a in the circumferential direction.

The second outer ring 1511b of the second bearing 151b is fixedly adhered to the inner circumferential surface of the bush 160. As the protrusion 161 of the bush 160 is engaged with the protrusion accommodating groove 162 of the second bearing housing 152b, the bush 160 can suppress the second bearing 151b from slipping on the inner circumferential surface of the second bearing housing 152b in the circumferential direction.

However, the outer circumferential surface of the bush 160 is movable on the inner circumferential surface of the second bearing housing 152b in the axial direction.

The wave washer 165 is brought into contact with the second outer ring 1511b of the second bearing 151b and elastically presses the second outer ring 1511b in the axial direction to apply a preload. The second outer ring 1511b moves in the axial direction.

Here, a movement distance of the second outer ring 1511b elastically pressed by the wave washer 165 may be equal to or shorter than the sum of a minute gap between the second outer ring 1511b and the second ball 1513b and a minute gap between the second inner ring 1512b and the second ball 1513b.

The second outer ring 1511b and the bush 160 move together in the axial direction along the inner circumferential surface of the second bearing housing 152b.

The second ball 1513b of the second bearing 151b is in two-point contact with the ball accommodating groove of the second outer ring 1511b and the ball accommodating groove of the second inner ring 1512b. An imaginary straight line that radially passes through the two contact points between the second ball 1513b and the second outer ring 1511b and between the second ball 1513b and the second inner ring 1512b is inclined with respect to the axial direction.

Axial force applied from the wave washer 165 is transmitted from the second outer ring 1511b to the second inner ring 1512b through the second ball 1513b. The rotating shaft 150 is moved in the axial direction by the axial force transmitted through the second inner ring 1512b.

The first inner ring 1512a of the first bearing 151a is moved in the axial direction by the axial force transmitted from the preload applying device 167 through the rotating shaft 150. The first inner ring 1512a moves relative to the first outer ring 1511a in a second axial direction. The second axial direction is the same as a direction that a thrust is applied.

Accordingly, the first inner ring 1512a is brought into contact with the first ball 1513a, and the first ball 1513a is brought into contact with the first outer ring 1511a. The first ball 1513a is in two-point contact between the ball accommodating groove of the first inner ring 1512a and the ball accommodating groove of the first outer ring 1511a.

Therefore, according to the present disclosure, the wave washer 165 can elastically press the second outer ring 1511b in the axial direction, to minimize the ball from minutely moving to any one side in the axial direction or/and the radial direction between the ball accommodating groove of the outer ring 1511 and the ball accommodating groove of the inner ring 1512. This can also minimize an occurrence of wear due to friction between the outer ring 1511 and the inner ring 1512 and the ball.

The bush 160 can suppress the second bearing 151b from slipping inside the second bearing housing 152b in the circumferential direction, and also the preload applying device 167 can continuously apply an appropriate preload to the bearing 151.

Figure 12:
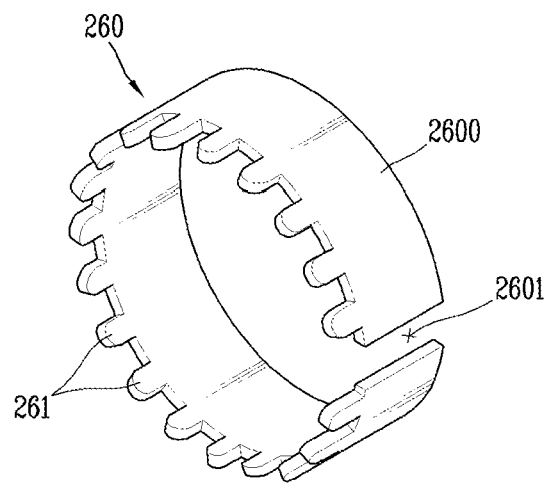
FIG. 12 is a perspective view illustrating that a protrusion of a bush is formed in a semi-circular shape in accordance with another embodiment of the present disclosure.

3. Description of Configuration of Fan Motor According to Another Embodiment FIG. 12 is a perspective view illustrating that a protrusion 261 of a bush 260 is formed in a semicircular shape in accordance with another embodiment of the present disclosure.

This embodiment is different from the previous embodiment of FIGS. 1 to 11 in that the protrusion 261 of the bush 260 is formed in a semicircular shape.

The bush 260 includes a bush body 2600 and a plurality of protrusions 261.

An opening 2601 may be formed through one side of the bush body 2600.

A plurality of protrusions 261 protrude in the axial direction from one axial end of the bush body 2600.

A plurality of protrusion accommodating grooves 162 are formed on an inner surface of the bearing housing 152. The plurality of protrusion accommodating grooves 162 and the plurality of protrusions 261 may be disposed to face each other in the axial direction.

However, one protrusion 260 or more than two protrusions 261 may be disposed on the bush 260. A plurality of protrusion accommodating grooves 162 are continuously formed on the inner surface of the bearing housing 152 along the circumferential direction.

Since other components are the same as or similar to those in the previous embodiment of FIGS. 1 to 11, a repeated description will be omitted.

Figure 13:
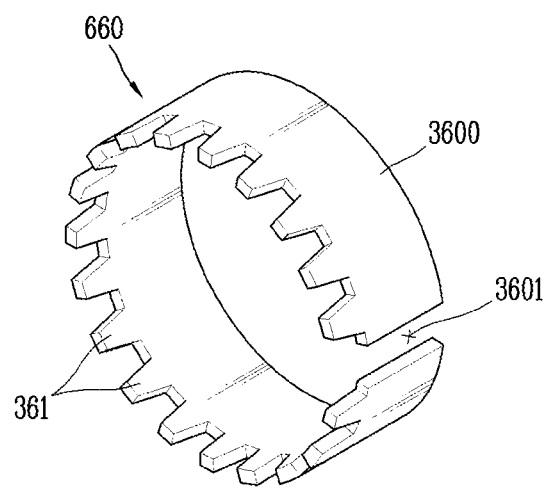
FIG. 13 is a perspective view illustrating that a protrusion of a bush is formed in a trapezoidal shape in accordance with still another embodiment of the present disclosure.

4. Description of Configuration of Fan Motor According to Still Another Embodiment FIG. 13 is a perspective view illustrating that a protrusion 361 of a bush 360 is formed in a trapezoidal shape in accordance with still another embodiment of the present disclosure.

This embodiment is different from the previous embodiments of FIGS. 1 to 12 in that the protrusion 361 of the bush 360 is formed in a trapezoidal shape.

Since other components are the same as or similar to those in the previous embodiment of FIGS. 1 to 12, a repeated description will be omitted.

What is claimed is:

1. A fan motor comprising:
   a rotating shaft;
   an impeller coupled to the rotating shaft;
   a motor, including:
      a rotor coupled to the rotating shaft, and
      a stator surrounding the rotor and configured to drive the rotating shaft;
   a bearing that supports the rotating shaft;
   a bearing housing that accommodates the bearing therein;
   a preload applying device disposed between one axial end of the bearing and the bearing housing and configured to apply a force to the one axial end of the bearing; and
   a bush coupled to an outer circumferential surface of the bearing and disposed at an inner circumferential surface of the bearing housing, the bush being configured to move in an axial direction,
   wherein a protrusion is provided at one axial end of the bush, and a protrusion accommodating groove is provided at an inner surface of the bearing housing,
   wherein the bush has a cylindrical shape,
   wherein the bush is formed by rolling a rectangular plate having a set thickness into a circular shape, and
   wherein an opening is defined between both ends of the rectangular plate in a circumferential direction.

2. The fan motor of claim 1, wherein the protrusion protrudes from the one axial end of the bush toward the inner surface of the bearing housing, and
   wherein the protrusion accommodating groove is recessed into the inner surface of the bearing housing and configured to accommodate the protrusion.

3. The fan motor of claim 1, wherein the protrusion includes a plurality of protrusions, and
   wherein the protrusion accommodating groove includes a plurality of protrusion accommodating grooves that are continuously disposed along a circumferential direction at the inner surface of the bearing housing.

4. The fan motor of claim 1, wherein the protrusion has a triangular shape, a semicircular shape, or a trapezoidal shape.

5. The fan motor of claim 1, wherein the protrusion accommodating groove has a plurality of inclined surfaces inclined at a preset angle in the axial direction, and wherein the protrusion is configured to be inserted between the plurality of inclined surfaces.

6. The fan motor of claim 1, wherein the bush is made of a metal material.

7. The fan motor of claim 1, wherein the preload applying device is a spring or a wave washer.

8. The fan motor of claim 1, wherein the bearing comprises:
   an inner ring coupled to the rotating shaft;
   an outer ring surrounding the inner ring; and
   a plurality of balls disposed between and are in contact with the inner ring and the outer ring,
   wherein the preload applying device is in contact with the outer ring and configured to apply the force toward the impeller in the axial direction.

9. The fan motor of claim 8, wherein the bearing includes a plurality of bearings and the bearing housing includes a plurality of bearing housings, and
   wherein the plurality of bearings are disposed on both ends of the rotating shaft such that the motor is interposed therebetween.

10. The fan motor of claim 9, wherein a first bearing of the plurality of bearings is disposed adjacent to the impeller, and a second bearing of the plurality of bearings is disposed at an opposite direction to the first bearing with respect to the motor,
    wherein a first outer ring of the first bearing is attached to an inner circumferential surface of a first bearing housing of the plurality of bearing housings and accommodates the first bearing therein, and
    wherein a second outer ring of the second bearing is attached to an inner circumferential surface of the bush, and the bush is disposed at an inner circumferential surface of a second bearing housing of the plurality of bearing housings and accommodates the second bearing therein, the bush being configured to move in the axial direction.

11. The fan motor of claim 10, further comprising a stopper that extends radially inward from one end of the first bearing housing covering the first bearing.

12. The fan motor of claim 10, further comprising:
    a shroud that accommodates the impeller therein;
    a plurality of vanes coupled to an inside of the shroud and configured to guide a flow of air suctioned by the impeller; and
    a vane hub that has the plurality of vanes on an outer circumferential surface thereof,
    wherein the first bearing is disposed downstream of the impeller based on a flow direction of the air, and
    wherein the first bearing housing is disposed inside the vane hub.

13. The fan motor of claim 10, further comprising:

a shroud that accommodates the impeller;

a first housing that accommodates the first bearing housing therein and is coupled to an inside of the shroud; and a second housing that accommodates the motor therein, disposed downstream of the first housing based on a flow direction of air suctioned by the impeller, and coupled to the inside of the shroud.

14. A fan motor comprising:

an impeller configured to suction air;

a rotating shaft coupled to the impeller;

a motor, including:

a rotor coupled to the rotating shaft, and a stator surrounding the rotor, and configured to drive the rotating shaft;

a plurality of bearings that support both ends of the rotating shaft such that the motor is interposed therebetween;

a plurality of bearing housings that respectively accommodate the plurality of bearings;

a preload applying device disposed in a bearing housing of the plurality of bearing housings and configured to apply a force to one axial end of the bearing; and a bush having a cylindrical shape and disposed between a bearing of the plurality of bearings and the bearing housing, wherein the bush has:

an inner circumferential surface that surrounds the bearing and is coupled with an outer circumferential surface of the bearing, an outer circumferential surface disposed in an opposite direction to the inner circumferential surface and is in contact with an inner circumferential surface of the bearing housing, and configured to move in an axial direction of the rotating shaft, and a protrusion disposed between the inner circumferential surface and the outer circumferential surface and protruding toward the bearing housing in the axial direction, wherein the bush is formed by rolling a rectangular plate having a set of thickness into a circular shape, and wherein an opening is defined between both ends of the rectangular plate in a circumferential direction.

15. The fan motor of claim 14, wherein a protrusion accommodating groove is provided at an inner surface of the bearing housing and configured to accommodate the protrusion.

16. The fan motor of claim 14, wherein the impeller is coupled to one end portion of the rotating shaft, wherein the plurality of bearings comprise:

a first bearing disposed upstream of the motor based on a flow direction of the air; and a second bearing disposed downstream of the motor, wherein the plurality of bearing housings comprise:

a first bearing housing that accommodates the first bearing therein; and a second bearing housing that accommodates the second bearing therein, wherein the bush is disposed between the second bearing and the second bearing housing, and wherein the preload applying device disposed in the second bearing housing is configured to transfer a force applied to the second bearing to the first bearing through the rotating shaft.

17. The fan motor of claim 14, wherein the bush is made of a metal material that is different from a material of which the bearing housing is made.

\* \* \* \* \*